United States Patent
Aetukuri et al.

(10) Patent No.: US 10,256,490 B2
(45) Date of Patent: *Apr. 9, 2019

(54) OXYGEN-SEPARATING DEVICE UTILIZING IONIC OXYGEN MOTION

(71) Applicant: INTERNATIONAL BUSINESS MACHINES CORPORATION, Armonk, NY (US)

(72) Inventors: Naga Phani B. Aetukuri, San Jose, CA (US); Stuart S. P. Parkin, San Jose, CA (US); Mahesh G. Samant, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/195,867

(22) Filed: Jun. 28, 2016

(65) Prior Publication Data

US 2017/0373335 A1    Dec. 28, 2017

(51) Int. Cl.
| | |
|---|---|
| *H01M 12/06* | (2006.01) |
| *H01M 8/0662* | (2016.01) |
| *B01D 53/32* | (2006.01) |
| *C01B 13/02* | (2006.01) |
| *B01D 71/02* | (2006.01) |

(52) U.S. Cl.
CPC .......... *H01M 8/0687* (2013.01); *B01D 53/32* (2013.01); *B01D 53/323* (2013.01); *C01B 13/0251* (2013.01); *B01D 71/024* (2013.01); *B01D 2256/12* (2013.01); *B01D 2257/102* (2013.01); *B01D 2325/26* (2013.01); *Y02E 60/128* (2013.01)

(58) Field of Classification Search
CPC .................................................... H01M 12/06
USPC ......................................................... 204/252
See application file for complete search history.

(56) References Cited

U.S. PATENT DOCUMENTS

| | | |
|---|---|---|
| 6,551,386 B2 | 4/2003 | Weiler |
| 6,592,782 B2 | 7/2003 | MacKay et al. |
| 6,767,663 B2 | 7/2004 | Li et al. |
| | (Continued) | |

FOREIGN PATENT DOCUMENTS

CN          1253849 A      5/2000

OTHER PUBLICATIONS

Jeong et al.,"Suppression of Metal-Insulator Transition in VO2 by Electric-Field Induced Oxygen Vacancy Formation", Science, vol. 339, pp. 1402-1405, 2013.

(Continued)

*Primary Examiner* — Zulmariam Mendez
(74) *Attorney, Agent, or Firm* — Daniel E. Johnson

(57) ABSTRACT

An apparatus for separating oxygen from a gas mixture includes an oxide layer having ion transport channels therein, which facilitate the migration of oxygen ions from a first side to a second side of the layer. Molecular oxygen is decomposed into oxygen ions at the first side, whereas oxygen ions recombine into molecular oxygen at the second side. A first chamber into which a gas mixture (e.g., air) is admitted is located on the first side of the oxide layer. A second chamber receives oxygen from the oxide layer, and is located on the second side of the oxide layer; the second chamber has a polarizable medium that is in contact with the oxide layer. A gate electrode in contact with the polarizable medium applies an electric field to the second side of the oxide layer, thereby driving oxygen ions across the oxide layer.

14 Claims, 9 Drawing Sheets

(56) References Cited

U.S. PATENT DOCUMENTS

| | | |
|---|---|---|
| 7,048,844 B2 | 5/2006 | Chen et al. |
| 7,211,345 B2 | 5/2007 | Hampden-Smith et al. |
| 8,500,874 B2 | 8/2013 | Tabata et al. |
| 8,728,214 B2 | 5/2014 | Maurer |
| 2003/0121801 A1 | 7/2003 | Inaba et al. |
| 2003/0188637 A1 | 10/2003 | Ito et al. |
| 2014/0030510 A1 | 1/2014 | Kimura et al. |
| 2015/0129431 A1 | 5/2015 | Winther-Jensen et al. |

OTHER PUBLICATIONS

Altendorf et al., "Facet-independent Electric-Field-induced volume Metallization of Tungsten Trioxide Films", Advanced Materials, vol. 28, pp. 5284-5292, 2016.

Li et al., "Suppression of Ionic Liquid Gate-Induced Metallization of $SrTiO_3(001)$ by oxygen", ACS Nano, vol. 13, pp. 4675-4678, 2013.

Chueh et al., "Electrochemistry of Mixed Oxygen Ion and Electron Conducting Electrodes in Solid Electrolyte Cells", Annual Rev. Chem. Biomol. Eng., vol. 3, pp. 313-341, 2012.

OXYGEN-SEPARATING DEVICE UTILIZING IONIC OXYGEN MOTION

TECHNICAL FIELD

The invention relates to the separation of oxygen from an oxygen-containing gas mixture with high selectivity. The selectivity is a result of electric fields generated at electric double layers to preferentially drive oxygen ionic motion in a solid state material.

BACKGROUND

Controlling the transport and structural properties of oxide thin films through various parameters (such as temperature, strain, and electric field) makes them useful for technological applications including sensor, memory and logic devices. Recently, a mechanism was demonstrated for controlling the properties of a class of oxide materials, namely, gating them with ionic liquids. The voltage gating of an ionic liquid (IL) at the surface of an oxide film can create an electric field large enough that oxygen migrates from within the interior of the film to its surface, as illustrated in FIG. 1. This process is reversible and can be used with a large class of oxides having channels through which oxygen ions migrate. Such an ion transport channel is a collection of lattice sites along which oxygen ion diffusion occurs, as opposed to diffusion through one or more mesoscopic pores.

Of particular interest are the oxides $VO_2$ and $WO_3$, which can be reversibly gated for thicknesses at least as large as ~120 nm. One consequence of the IL gating is the change in conductivity of the oxide films. In particular, for $VO_2$, which displays a metal to insulator transition (MIT) near room temperature, one observes a suppression of this MIT even at low temperatures. The observed conductivity increase of the insulating state upon IL gating (application of positive gate voltage) is roughly three orders of magnitude and is non-volatile (see Jeong et al., "Suppression of metal-insulator transition in $VO_2$ by electric-field induced oxygen vacancy formation", Science, vol. 339, pp. 1402-1405, 2013). The material retains its conducting properties even when the bias voltage is reduced to zero and, further, even after the removal of the ionic liquid. The original high resistance state of the pristine material can be reached upon application of a reverse gate voltage (negative gate voltage). Upon IL gating (application of a positive gate voltage) in the case of $WO_3$, which is a band insulator, one observes an increase in conductance of almost six orders of magnitude (see Altendorf et al., "Facet-independent electric-field-induced volume metallization of tungsten trioxide films", Advanced Materials, 2016). For both of these oxides, the original insulating state is reached during reverse gating by migration of oxygen from the surface of the film and/or the ionic liquid to its interior. This gate-induced migration of oxygen in and out of the oxide film demonstrates the utility of the oxide film for the transport of oxygen across the film thickness. FIG. 2 shows an IL gating effect for a 10 nm $VO_2$ thin film. The pristine film shows an MIT characteristic of $VO_2$, which is suppressed by IL gating due to the creation of oxygen vacancies.

One observes a clear correlation between the increased conductivity of the film and the removal of oxygen from the film, while the converse is also true. In particular, the film conductivity depends on the oxygen present in the environment during the IL gating process. The presence of a sufficiently high concentration of oxygen can completely suppress any gate-induced conductivity increase. Other gases including nitrogen or argon have no significant effect on the IL gating process (see Li et al., "Suppression of ionic liquid gate-induced metallization of $SrTiO_3(001)$ by oxygen", ACS Nano, vol. 13, pp. 4675-4678, 2013). This is evidence of an extremely high specificity of the IL gating process to oxygen.

High purity oxygen finds wide-ranging applications in many fields such as medicine, manufacturing, energy storage and transportation. Existing techniques for the separation of oxygen from air include rectification, selective adsorption in the pores of zeolite-based materials and/or the use of porous gas separating membranes. The primary challenge in separating oxygen is distinguishing it from nitrogen, which is the primary constituent of air. Molecular nitrogen is similar in size to molecular oxygen and therefore is difficult to separate from oxygen using processes that depend on adsorption or gas permeation. Furthermore, the two gases have very similar boiling points, thereby limiting the separation efficiency in air "rectification" techniques. In order for these processes to be effective, they require either low temperatures (~−190° C.) or high pressures or both. Although they are attractive for mass production of oxygen, in general these techniques produce low purity oxygen after single stage purification. Multiple stages of purification are required to obtain higher purity. This is a serious limitation when high purity oxygen is required on a small scale. For example, on-demand production of high purity oxygen is essential for a metal-air battery system. Although mixed ionic and electronically conducting ceramic membranes have also been proposed for gas separation, these approaches still require high temperatures (~800-900° C.) and high pressures to enable efficient gas separation. In short, state of the art techniques require extensive gas handling apparatuses, making them bulky and unsuitable for portable applications requiring high purity oxygen.

These stringent operating conditions require gas separation membranes possessing high thermal stability, chemical inertness and mechanical integrity. Furthermore, gas separation membranes should be constructed such that they can withstand high pressure-differentials and/or high temperatures.

SUMMARY

The IL gate-induced transport of oxygen (more generally, transport induced by a polarizable medium) across oxide films and the concomitant change in conductivity of the oxide film is utilized in a highly selective oxygen separating device based on the principle of ionic liquid gating driven oxygen ionic motion. In particular, a gas separating device is described that utilizes electric field gradients generated by electric-double layers to create and transport oxygen ions across thin membranes that do not need to support a substantial pressure differential and thus can be made thinner and are much less susceptible to damage. Moreover, the chemical specificity to oxygen is very high, because only oxygen ions can readily pass through the oxide membrane. Large electric field gradients required to create and drive oxygen ions are preferably generated by ionic liquid gating of the oxide layer. The large electric fields make ionic motion possible even at room temperature. As a consequence, high temperature operation and the high temperature stability of membranes are not absolute requirements in some embodiments of the described invention, although elevated temperatures may accelerate the process of oxygen separation. A trade-off between lifetime of the membrane and speed of operation is possible.

One embodiment of the invention is an apparatus that includes an oxide layer having ion transport channels therein, with the channels facilitating the migration of oxygen ions from a first side of the layer to a second side of the layer. The apparatus also includes (i) a first chamber into which a gas mixture is admitted, with the first chamber being located on the first side of the oxide layer, and (ii) a second chamber into which oxygen is admitted from the oxide layer, the second chamber being located on the second side of the oxide layer, and the second chamber having a polarizable medium therein that is in contact with the oxide layer. Further, the apparatus includes a gate electrode that is in contact with, and applies a voltage to, the polarizable medium, such that an electric field is applied to the second side of the oxide layer, thereby driving oxygen ions across the oxide layer, so that oxygen ions travel from the first side of the oxide layer to the second side of the oxide layer. Molecular oxygen is decomposed into oxygen ions at the first side of the oxide layer, and oxygen ions recombine into molecular oxygen at the second side of the oxide layer. The oxide layer preferably has an electronic resistivity of <1 mΩ-cm when the electric field is applied to the second side of the oxide layer; the electric field employed is preferably greater than 10 MV/m. The oxide layer has a preferred thickness of greater than 10 nm and less than 1 µm. The polarizable medium of at least one of the chambers is preferably an ionic liquid, an ionic gel and/or a molten salt. An array of such apparatuses may be constructed, leading to an enhanced oxygen separation rate.

In a preferred aspect of the invention, the apparatus is used to separate oxygen from air. The oxygen separation rate may be advantageously enhanced by increasing the temperature of the oxide layer.

In another preferred aspect of the invention, the apparatus is employed at a temperature in the range between the freezing point and the boiling point of the polarizable medium.

In yet another preferred aspect of the invention, the apparatus supplies oxygen to a metal-air battery, a metal-oxygen battery, or a combination thereof.

DETAILED DESCRIPTION

Figure 1:
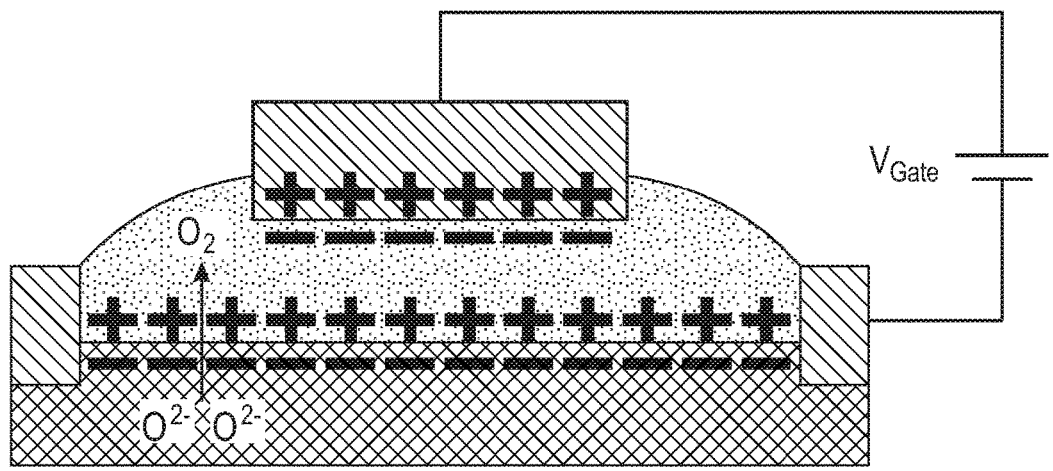
FIG. 1 illustrates the principle of ionic motion driven by a large electric field generated by an electrical-double layer.

FIG. 1 illustrates ionic motion driven by a large electric field produced by an electric-double layer, which is created by the voltage gating of a polarizable medium such as an ionic liquid (discussed in greater detail below). A 3-terminal device configuration is shown, in which a voltage difference applied between the metal electrodes (e.g., gold) leads to the formation of an electric double layer. This voltage difference may be on the order of 1-3 V. The interfacial electric field at the interface between the oxide layer and the polarizable medium is large enough to drive oxygen ionic motion (see Jeong et al., supra). The oxide is preferably formed from a material (e.g., $VO_2$, $TiO_2$, $WO_3$, and $SrTiO_3$) that includes channels that permit oxygen ion diffusion (along their length). Crystallographic lattice sites along which oxygen ion diffusion occurs in oxide materials are referred to as oxygen ion conducting channels, ion transport channels, or simply channels. The diffusion of oxygen ions through such channels is driven by an oxygen vacancy chemical potential gradient. The thickness of the oxide layer is preferably on the order of 10-1000 nm. The width of the device is less critical, and may be in the range of 100 nm to 1 mm, for example. The distance between the top (gated) electrode and the oxide layer may be advantageously between 20 nm to 100 microns; the lower limit is set by the molecular size of the molecules in the ionic liquid, if that is used as the polarizable medium.

Figure 2:
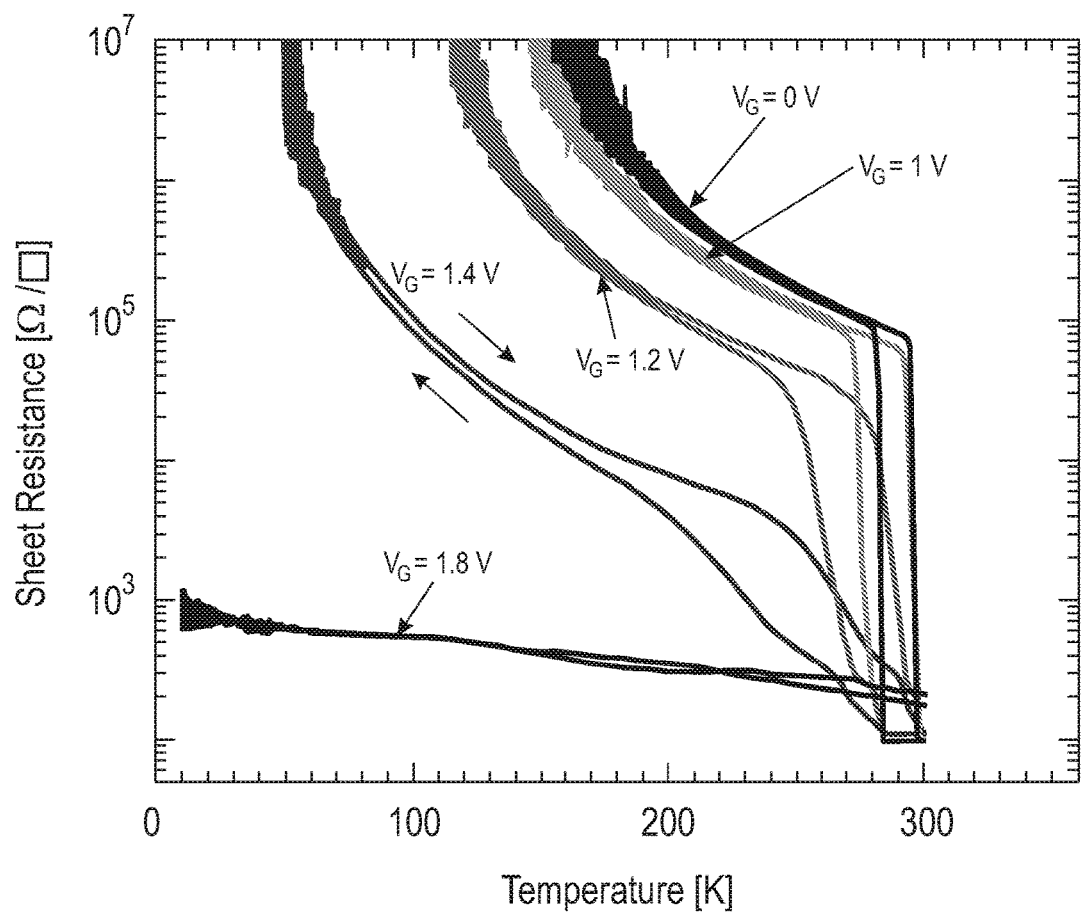
FIG. 2 illustrates ionic liquid gating induced MIT suppression in $VO_2/TiO_2$ films (taken from Jeong et al., supra).

FIG. 2 shows the suppression of the metal to insulator transition in $VO_2$ film upon ionic liquid gating for the device configuration shown in FIG. 1. The metal to insulator transition is suppressed only at gate voltages greater than 1 V. At the maximum applied gate voltage of 1.8 V, the $VO_2$ film is completely metallic, as a result of the creation of oxygen vacancies in the film (see Jeong et al., supra). Oxygen vacancies are created in the $VO_2$ film due to electric field driven oxygen ionic motion. The electric field is generated by the electrical double layer formed by the application of the gate voltage.

Oxygen Ion Transport Theory

First, we assume that oxygen-ion transport is driven by the vacancy mechanism. Vacancy formation and annihilation reactions are given by the following equilibrium equation (Kröger-Vink notation is used) where all the symbols have their usual meaning.

$$\tfrac{1}{2}O_2 + V_{\ddot{O}} \leftrightarrow O_O^x + 2h \quad (1)$$

Here $V_{\ddot{O}}$ represents a doubly-ionized oxygen vacancy, h represents a hole, and $O_O^x$ represents an oxygen ion on the oxygen lattice site.

Figure 3:
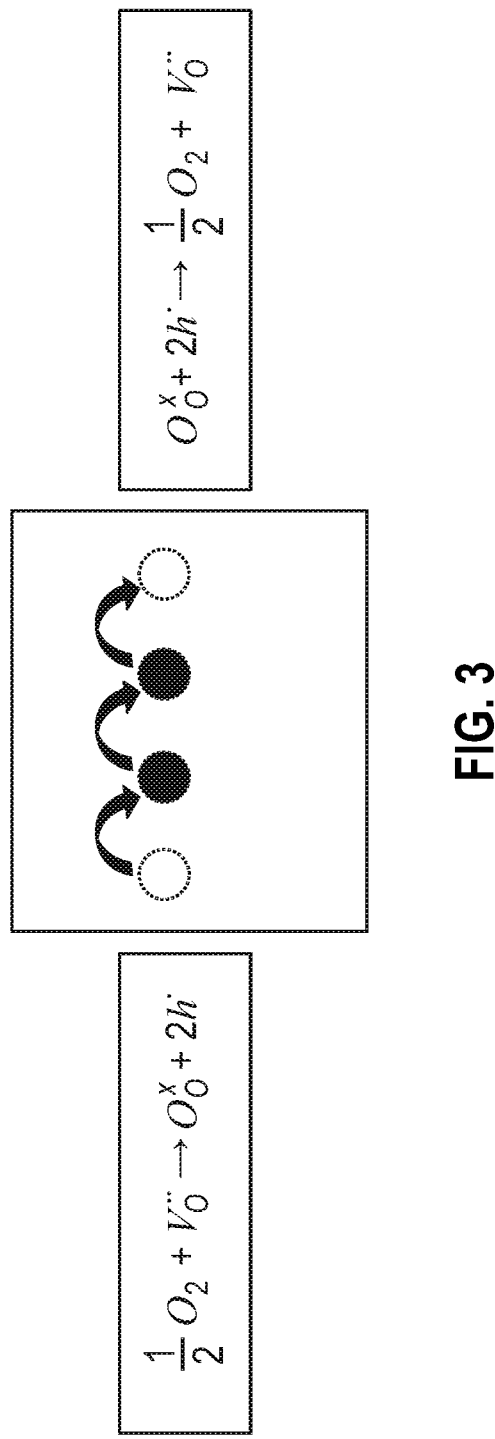
FIG. 3 is a schematic of the oxygen vacancy transport in an oxygen-ion conductor. It is assumed that the composition and/or potential differences are such that the oxygen vacancies move from left to right in the diagram. In this figure and others herein, filled circles represent an oxygen ion in the lattice of the oxide layer, whereas open circles represent oxygen vacancies.

In the oxide thin films of interest to the applications and embodiments of this invention (such as $VO_2$ and $WO_3$), there is enough electronic conductivity that the electrochemical vacancy formation and annihilation reactions occur on the surfaces of the oxide thin film membrane, as shown schematically in FIG. 3.

The transport of oxygen-ions in oxide materials is usually mediated by oxygen vacancy diffusion. In the absence of an electric field, $\vec{E}=0$, the oxygen ionic diffusion is a thermally activated process and is given by:

$$D_{\vec{E}=0} = D_0 e^{-U/kT} \quad (2)$$

In the above equation, $D_{\vec{E}=0}$ is the diffusivity at $\vec{E}=0$, U is the activation barrier for vacancy hopping, k is the Boltzmann constant, and T is the temperature. An increase in temperature increases the diffusive current of oxygen vacancies. Conventional oxygen separation membranes take advantage of fast oxygen-ion transport at high temperatures. It is generally assumed that the electric fields available for the drift of oxygen vacancies are small enough that the diffusion coefficient is independent of electric field. In the case of IL gating, the electric fields are intense enough that the diffusion constant is no longer independent of the electric field. In preferred embodiments of this invention, fast-ion transport at room temperature is achieved by applying large electric fields via ionic liquids for oxygen separation at or near room temperature. In the next section, the theory for diffusion at large electric fields is outlined.

Diffusion in an Electric Field

Figure 4:
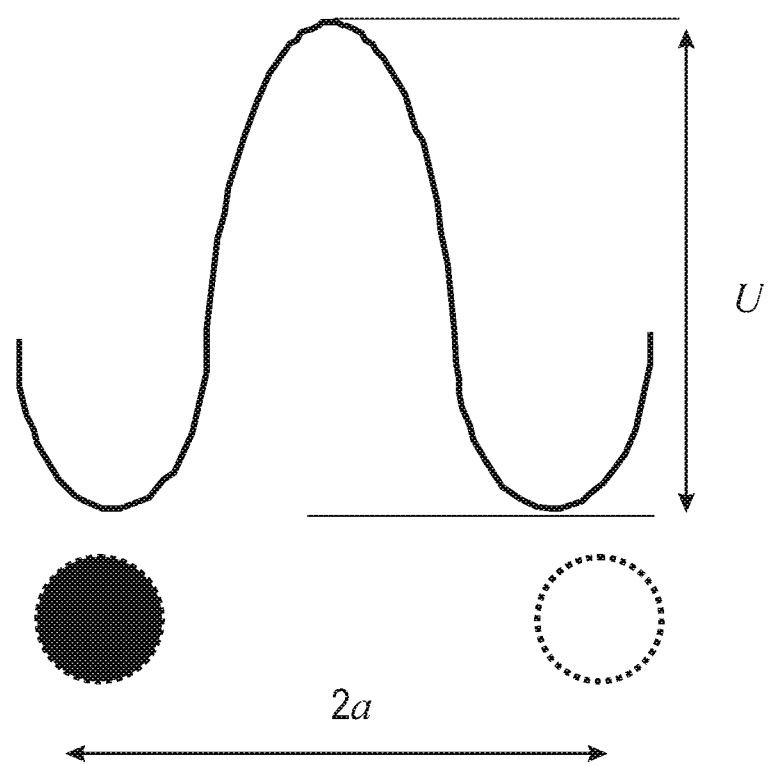
FIG. 4. Potential Energy around an oxygen vacancy in the absence of an electric field. U is the activation barrier for vacancy hopping in a lattice.
Figure 5:
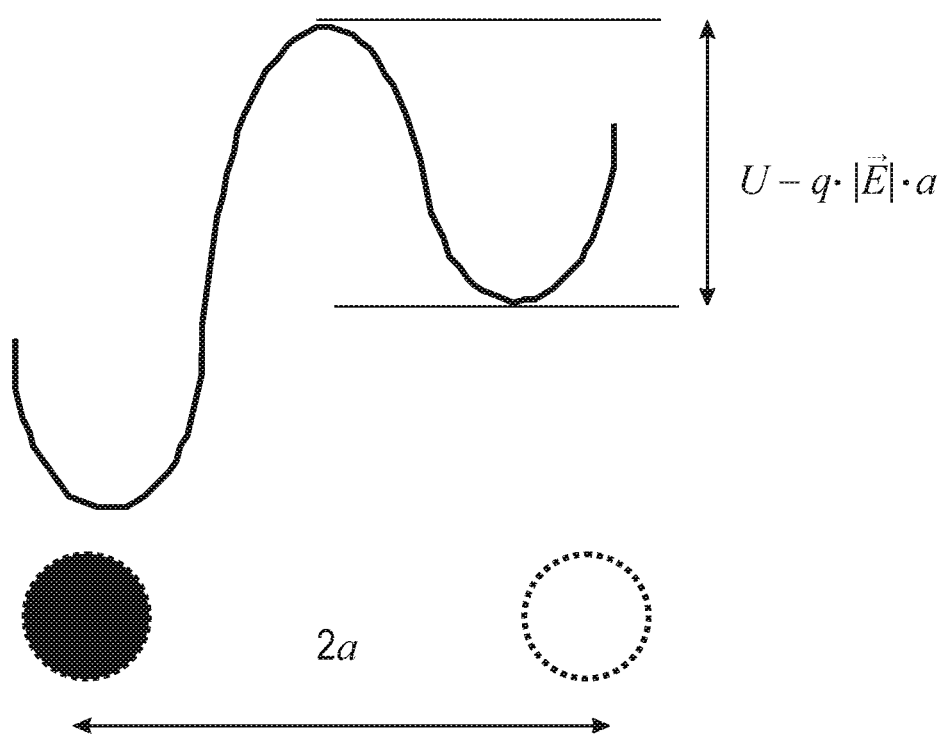
FIG. 5. Potential Energy U around a vacancy in the presence of an electric field, $\vec{E}$. The activation barrier for vacancy hopping in a lattice is decreased by the quantity $q \cdot |\vec{E}| \cdot a$.

First, we consider the potential energy landscape of an oxygen vacancy in an oxygen ion lattice. The barrier to the hopping of an oxygen vacancy across the shortest jump distance of 2a is the activation energy U (see FIG. 4). Upon the application of a positive electric field (see FIG. 5), the potential barrier is skewed to favor the forward (left to right) jump of the oxygen ion (or the backward jump of the oxygen vacancy). This is equivalent to the lowering of the energy barrier by the quantity $q \cdot |\vec{E}| \cdot a$, where q is the charge on the defect, $\vec{E}$ is the electric field, and 2a is the shortest jump distance. The decreased activation barrier in the presence of an electric field increases the diffusivity at any given temperature. This can be written as:

$$D = D_0 e^{(-U + q \cdot |\vec{E}| \cdot a)/kT} = D_{\vec{E}=0} e^{(q \cdot |\vec{E}| \cdot a)/kT} \quad (3)$$

Figure 6:
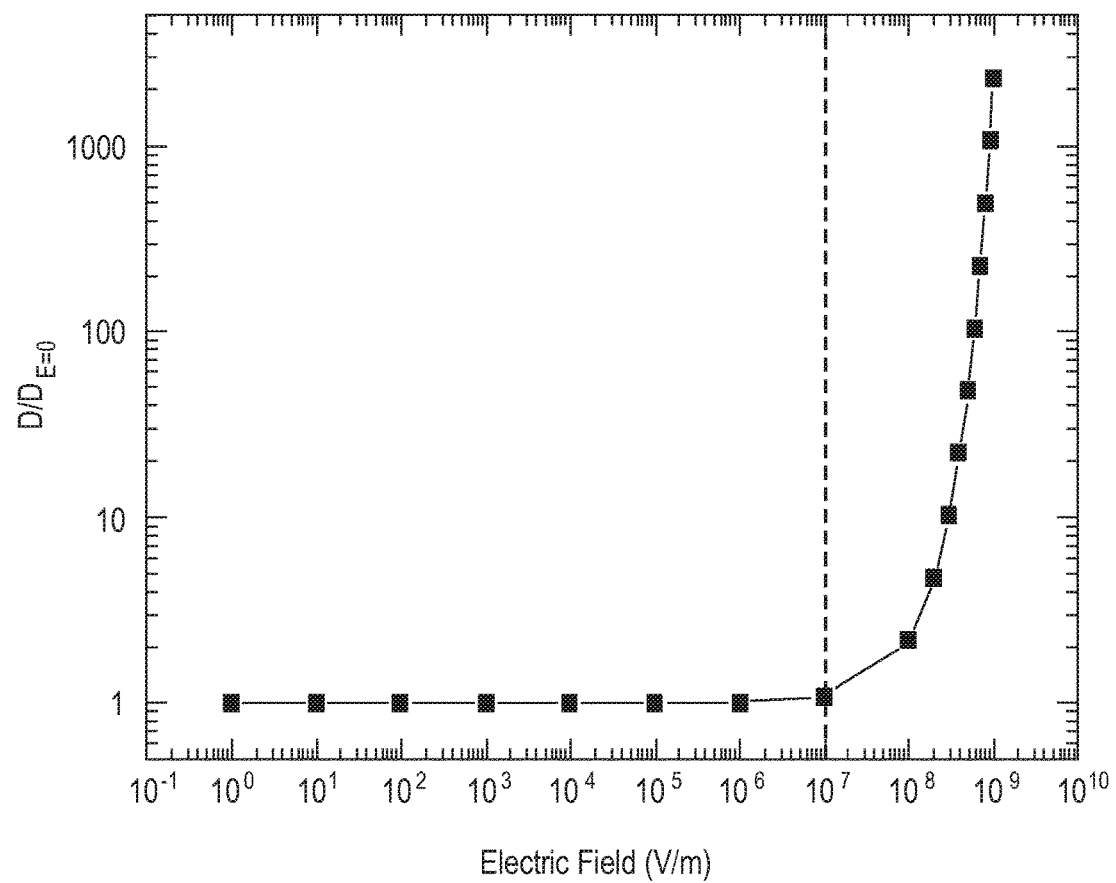
FIG. 6. Plot of diffusivity enhancement with electric field. At high electric fields ($>10^7$ V/m), there is a rapid increase in the diffusivity when compared to the zero-field diffusivity.

Clearly, the term $e^{(q \cdot |\vec{E}| \cdot a)/kT}$ implies that the diffusivity enhancement is exponential with respect to electric field strength. This enhancement in diffusivity for oxygen vacancy diffusion in the presence of an electric field is plotted in FIG. 6. There is a giant enhancement in the diffusivity at electric fields above $10^7$ V/m. It is this enhancement in oxygen ion conductivity at large electric fields that is leveraged here for the purpose of oxygen separation. By using ionic liquids, interfacial electric fields $>10^8$ V/m are easily possible within the electrical double layer, and therefore these large electric field regimes can be generated using relatively small voltages (e.g., 1-3 V).

The electrical double layer is formed at the interface between a polarizable medium and a metallic electrode. The surface charges on a metallic electrode, which can be controlled by the application of an electric potential, electrostatically attract ions of opposite charge present in the polarizable medium. The layer of surface charge on the metallic electrode and the layer of ions of the medium together form the double layer. The double layer of charges can be viewed as a parallel plate capacitor, in which the distance between the plates is determined by the ionic size, or in the case of electrolyte solutions, by the size of the ionic solvate. It is assumed that the interaction is predominantly electrostatic and that negligible electrochemical reactions occur.

Figure 7:
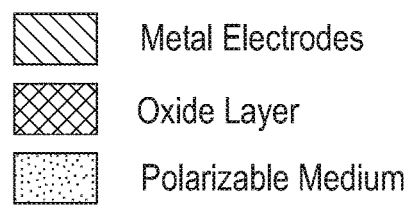
FIG. 7. A schematic (cross sectional view) of one embodiment of the invention, including an oxygen separation membrane. Dry air enters from the first side and oxygen gas is collected on the second side of the membrane.
Figure 7:
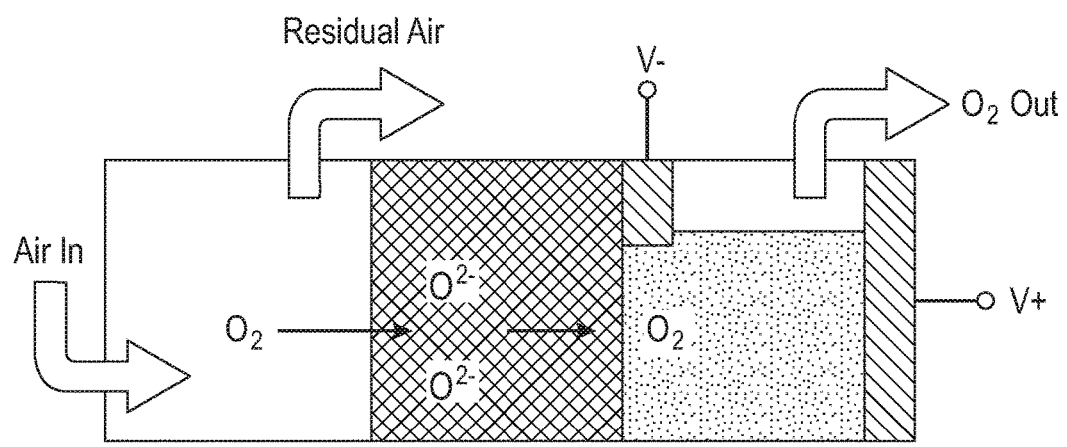
Figure 8:
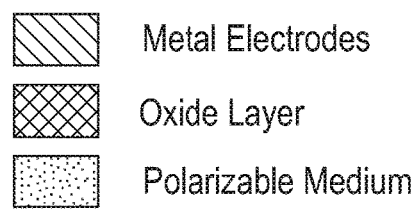
FIG. 8. A schematic (cross sectional view) of a second embodiment of the invention, including an oxygen separation membrane. As in the first embodiment, dry air enters from the first side and oxygen gas is collected on the second side of the membrane. However, in this embodiment, a polarizable medium is present in both chambers to facilitate rapid oxygen ion motion.
Figure 8:
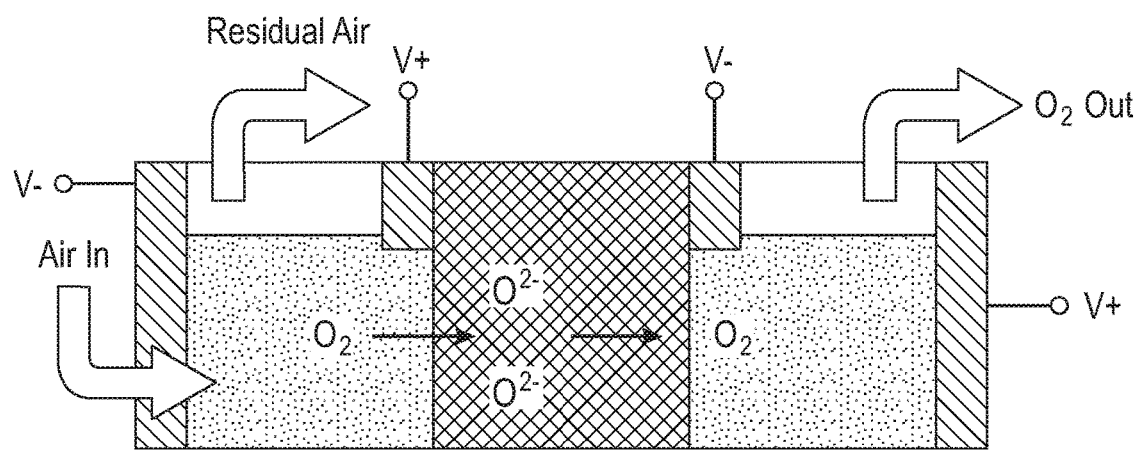
Figure 9:
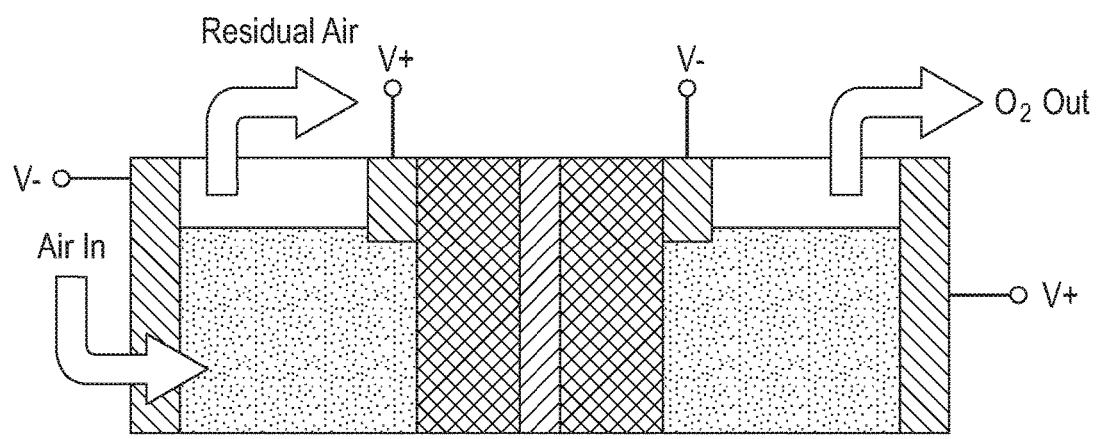
FIG. 9. A schematic (cross sectional view) of a third embodiment of the invention, including an oxygen separation membrane. As in the second embodiment, dry air enters from the first side and oxygen gas is collected on the second side, and a polarizable medium is present in both chambers to facilitate rapid oxygen ion motion. In this embodiment, an additional electrically-insulating oxygen ion conductor is present, thereby making a heterostructure that enables the application of voltage on either side of the oxide layer without electrical shunting.

FIGS. 7, 8, and 9 are cross sectional views of three different embodiments of oxygen separation devices. Each of these devices consists of two chambers (represented by the blank, unmarked regions) separated by at least a gas impermeable oxide layer or membrane. In each device, air (that is preferably clean and dry as a result of prior filtering using absorbers or another cleaning apparatus) is introduced into one chamber (e.g., without loss of generality, the left chamber, as shown here) of the device.

Molecular oxygen (e.g., in air) is catalytically divided into two oxygen ions on the surface of the oxide membrane (facing the left chamber), ions which can then migrate through the oxygen ion transport channels present in the oxide membrane (facing the right chamber), eventually making their way through the oxide membrane. This is possible if there is sufficient electronic conductivity in the oxide membrane. The oxide membrane preferably has an electronic resistivity of <1 mΩ-cm when the electric field is applied via ionic liquid gating.

The oxygen ions recombine at the interface between oxide membrane and the ionic liquid. However, if the input gas contains species other than oxygen, such as nitrogen or argon, these other species are not transported through the oxide membrane, since it is impermeable to those species. Details regarding the catalytic processes leading to oxygen ions can be found in the reference Chueh et al., "Electrochemistry of mixed oxygen ion and electron conducting electrodes in solid electrolyte cells", Annual Rev. Chem. Biomol. Eng., vol. 3, pp. 313-341, 2012. Residual nitrogen, argon, and other gaseous species in air flow out of the device (as indicated by the arrow) through an outlet for these gases.

FIG. 7 shows a first embodiment where an intense electric field is applied to the surface of the oxide membrane (facing the right chamber) by the use of a polarizable medium (preferably an ionic liquid) in the chamber located on the right side of the oxide membrane of FIG. 7. The ionic liquid is polarized (leading to charge accumulation at the interface with the oxide membrane) by applying a voltage between (i) a gate electrode (here: located on the far right hand side) that is in contact with the ionic liquid and (ii) a second electrode that is connected to the oxide membrane itself (here: connected to the top end of the oxide membrane). The gate electrode can be positioned in a number of places, provided that the ionic liquid covers both the gate electrode and the membrane surface (facing the right chamber). The gate electrode surface area is preferably at least as large as the surface area of the oxide membrane. The available surface area of the gate electrode may advantageously be enhanced by using a porous electrode structure. The device is used by introducing air into the left chamber while the gate electrode is positively biased with a voltage that both exceeds a minimum threshold voltage and is within the electrochemical stability window for the particular ionic liquid used. The ionic liquid can be chosen from a wide variety of ionic liquids that are both (i) liquid at the operation temperature of the device and (ii) stable to high potentials. Higher voltages and/or higher temperatures will accelerate the process of oxygen separation. The operating temperature range will generally be limited to temperatures between the freezing point and the boiling point of the ionic liquid (polarizable medium).

The material for the oxide membrane is chosen from the class of oxygen ionic conductors for which an electric field provided at the surface of the membrane causes migration of oxygen ions through the membrane. The electric field needs to be sufficiently intense that it results in the motion of oxygen ions. Such an intense field is advantageously provided herein by the use of a polarizable medium, such as an ionic gel (e.g., a mixture of a triblock copolymer, such as polystyrene-poly(ethylene oxide)-polystyrene, and an ionic liquid), a molten salt (e.g., single or multi-component salt mixtures, such as NaCl, optionally mixed with KCl), and/or an ionic liquid, although the latter is preferred. An ionic liquid in contact with the surface of the oxide membrane provides an intense electric field, when the ionic liquid is polarized by a small voltage applied across the liquid. Typical voltages that are required to polarize the IL are in the range of 1-3 V. The maximum voltage that can be applied to the ionic liquid depends on the so-called electrochemical stability window of the IL. Examples of useful ionic liquids include ethylmethylimidazolium bis(trifluoromethanesulfonyl)imide (EMIM-TFSI), butylmethylimidazolium bis(trifluoromethanesulfonyl)imide (BMIM-TFSI), hexylmethylimidazolium bis(trifluoromethanesulfonyl)imide (HMIM-TFSI), ethylmethylimidazolium trifluoromethanesulfonate (EMIM-triflate), butylmethylimidazolium trifluoromethanesulfonate (BMIM-triflate), hexylmethylimidazolium Trifluoromethanesulfonate (HMIM-triflate), ethylmethylimidazolium Tetrafluroborate (EMIM-BF4), butylmethylimidazolium tetrafluroborate (BMIM-BF4), hexylmethylimidazolium tetrafluroborate (HMIM-BF4), ethylmethylimidazolium hexafluorophosphate (EMIM-PF6), butylmethylimidazolium hexafluorophosphate (BMIM-PF6), hexylmethylimidazolium hexafluorophosphate (HMIM-PF6), and N,N-diethyl-N-(2-methoxyethyl)-N-methylammoniumbis(trifluoromethylsulfonyl)imide (DEME-TFSI).

The oxide material is preferably $VO_2$, $TiO_2$, $SrTiO_3$ and/or $WO_3$. These materials have a physical structure that includes channels for the passage of oxygen ions. $VO_2$ having a rutile structure is preferred, since it affords the highest oxygen conductivity along channels oriented along the compound's crystallographic c axis. The crystallographic framework of $VO_6$ octahedra that are edge-shared along the c axis, but corner-shared along the a and b crystallographic axes, gives rise to the observed anisotropic oxygen ion transport.

Similarly, other rutile oxides can be used, such as $TiO_2$. The dimensions of the channels perpendicular to the c axis vary with respect to the radius of the transition metal cation. For $TiO_2$, larger channels mean that oxygen can migrate more readily. $WO_3$ has a different crystal structure based on the cubic perovskite structure, with the nominal formula $ABO_3$ in which the A cations are not present in $WO_3$. $WO_6$ octahedra are corner-shared in all directions leading to open channels along all principal crystallographic axes. Other oxides with different crystal structures (but with channels along which oxygen ions can migrate under the application of sufficiently intense electric fields at the surface of the oxide) can also be used, e.g., greater than 10 MV/m.

In the second embodiment, as shown in FIG. 8, an electric field is applied to both sides of the oxide membrane using ionic liquids in both chambers, each of which is in contact with an oxide membrane surface. On the right side, an electric field is applied to force the extraction of oxygen from the oxide membrane into the liquid in the right chamber, as in the first embodiment. On the left side, where air is introduced, an electric field of opposite polarity is applied to the oxide membrane surface, so as to favor the introduction of the oxygen ions into the channels within the oxide membrane. Thus, in this second embodiment, the electric fields that are applied to both sides of the oxide membrane urge oxygen ions to migrate from one side of the oxide membrane to the other side. As shown in FIG. 8, a second gate electrode is needed to bias the left side of the oxide membrane.

Because ionic liquid is present on the input side of the oxide membrane (shown on the left hand side of FIG. 8), air must first diffuse through ionic liquid before reaching the (input) surface of the oxide membrane, where the oxygen in the air is separated from its other constituents. The kinetics of the oxygen separation are generally still limited by the oxygen ion transport within the oxide membrane. Therefore, this additional diffusion through the ionic liquid does not significantly affect the oxygen separation kinetics.

In the third embodiment shown in FIG. 9, an additional electrically insulating layer (which is an oxygen ion conductor) is positioned in the middle of the oxide membrane, to allow for the improved establishment of electric fields across both portions of the oxide membrane. The structure and the operation of the device is otherwise substantially the same as the one shown in FIG. 8. This additional insulating layer (e.g., ceria or yttria-stabilized zirconia) may be formed by physical vapor deposition techniques, similar to the techniques used for the deposition of the oxide membrane. This layer is advantageous, because ionic liquid gating of an oxide membrane material (e.g., $VO_2$, $TiO_2$, $WO_3$, and $SrTiO_3$) will metallize the oxide, leading to a short circuit. The presence of the additional insulating material ensures that there is no significant electronic leakage current across the oxide membrane, even when the oxide membrane is metallized by ionic liquid gating. Such an electrical discontinuity makes it possible to apply a greater potential difference across the membrane, which then accelerates the oxygen separation process. The thickness of this additional insulating layer can advantageously be between 10 nm and 100 nm, wherein the lower thickness limit is determined by the quantum mechanical tunneling length scale of the insulating layer material. For most insulating materials, the quantum tunneling current is negligible for thicknesses on the order of 10 nm.

For the embodiments shown in FIGS. 7-9, the devices can be prepared using microfabrication techniques, in which an oxide film is deposited onto a substrate (e.g., one selected to enable epitaxial growth) by physical vapor deposition. Most or all of this substrate may then be etched away (e.g., using dry or reactive ion etching), leaving an oxide membrane having two planar oxide surfaces. One of these surfaces is then used for the input of oxygen, while the other is used for the extraction of oxygen, as indicated by the arrows in the figures. The thickness of the oxide layer may be advantageously greater than 10 nm and less than 1 μm. The cross-sectional area of the planar surfaces can be advantageously chosen to control the oxygen separation rate, which is largely proportional to this cross sectional area (for a given polarizable medium). The area-normalized flow rate (flux) through the oxide membrane may fall in the range of 0.5 nL-0.5 μL/min/mm$^2$. This flux is dependent on a number of parameters, such as temperature, gate voltage, the oxide membrane material, thickness of the oxide material, and viscosity of the ionic liquid used as the polarizable medium.

The overall size of the described devices is related to the dimensions of the oxide membrane. For example, for the oxide membranes made for various test devices, the cross sectional area (facing the input or oxygen source) was on the order of 1 mm$^2$ to 1 cm$^2$. However, devices having larger cross sectional areas may also be easily fabricated, and would be advantageous in that they would permit even higher oxygen output. Likewise, devices having smaller cross sectional areas may also be fabricated.

In addition, arrays of the aforementioned devices can be constructed, in order to enhance the overall oxygen separation rate. For such an array of devices, the devices are preferably connected in parallel, so that the oxygen separation rates of the devices are additive.

In one preferred application of the invention, the apparatus supplies oxygen to a metal-air battery, a metal-oxygen battery, or a combination thereof. The use of high purity oxygen (substantially free of contaminants) improves the battery's rechargeability.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

The invention claimed is:

1. An apparatus, comprising:
    an oxide layer having ion transport channels therein, the channels facilitating the migration of oxygen ions from a first side of the layer to a second side of the layer;
    a first chamber into which a gas mixture is admitted, the first chamber being located on the first side of the oxide layer;
    a second chamber into which oxygen is admitted from the oxide layer, the second chamber being located on the second side of the oxide layer, the second chamber having a polarizable medium therein that is in contact with the oxide layer; and
    a gate electrode that is in contact with, and applies a voltage to, the polarizable medium, such that an electric field is applied to the second side of the oxide layer, thereby driving oxygen ions across the oxide layer, so that oxygen ions travel from the first side of the oxide layer to the second side of the oxide layer, wherein:
    molecular oxygen is decomposed into oxygen ions at the first side of the oxide layer; and
    oxygen ions recombine into molecular oxygen at the second side of the oxide layer.

2. The apparatus of claim 1, wherein the oxide layer includes at least one of $WO_3$, $TiO_2$, $VO_2$, and $SrTiO_3$.

3. The apparatus of claim 1, wherein the oxide layer has an electronic resistivity of <1 mΩ-cm when the electric field is applied to the second side of the oxide layer.

4. The apparatus of claim 1, wherein the oxide layer has a thickness of greater than 10 nm and less than 1 μm.

5. The apparatus of claim 1, wherein the first chamber contains a polarizable medium.

6. The apparatus of claim 5, wherein the polarizable medium of at least one of the chambers is an ionic liquid, an ionic gel and/or a molten salt.

7. The apparatus of claim 1, wherein the electric field is >10 MV/m.

8. The apparatus of claim 1, wherein the oxide layer and the chambers together form at least part of an oxygen separating device.

9. The apparatus of claim 1, wherein the gas mixture is air, and an oxygen-depleted gas mixture is emitted away from the first chamber.

10. The apparatus of claim 1, further comprising one or more of additional apparatuses given by claim 1, thereby forming an array of apparatuses, leading to an enhanced oxygen separation rate.

11. A method comprising:
    using the apparatus of claim 1 to separate oxygen from air.

12. The method of claim 11, wherein the oxygen separation rate is enhanced by increasing the temperature of the oxide layer.

13. The method of claim 11, wherein the apparatus supplies oxygen to a metal-air and/or metal-oxygen battery.

14. A method, comprising:
    employing the apparatus of claim 1 at a temperature in the range between the freezing point and the boiling point of the polarizable medium.

* * * * *